(12) United States Patent
Karmarkar et al.

(10) Patent No.: US 12,467,512 B2
(45) Date of Patent: Nov. 11, 2025

(54) BEARING BUSH FOR VIBRATION ISOLATION BETWEEN TWO VEHICLE COMPONENTS OF A MOTOR VEHICLE

(71) Applicants: Hyundai Motor Company, Seoul (KR); Kia Corporation, Seoul (KR)

(72) Inventors: Ameya Karmarkar, Russelsheim am Main (DE); Christian Ludwig, Zwingenberg (DE)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 436 days.

(21) Appl. No.: 17/984,628

(22) Filed: Nov. 10, 2022

(65) Prior Publication Data
US 2024/0093722 A1 Mar. 21, 2024

(30) Foreign Application Priority Data
Sep. 20, 2022 (DE) .......................... 102022209880.3

(51) Int. Cl.
*F16F 1/38* (2006.01)
(52) U.S. Cl.
CPC ............ *F16F 1/38* (2013.01); *F16C 2326/01* (2013.01)
(58) Field of Classification Search
CPC .......... F16F 1/373; F16F 1/376; F16F 1/3814; F16F 1/025; F16F 1/3735; F16F 13/14; F16F 15/08; F16F 1/38; F16C 2326/01
See application file for complete search history.

(56) References Cited

U.S. PATENT DOCUMENTS

| 2015/0176672 | A1 | | 6/2015 | Rehwald et al. |
| 2020/0124088 | A1 | * | 4/2020 | Firszt .................... F16F 1/3835 |

FOREIGN PATENT DOCUMENTS

| CN | 114484088 | A | * | 5/2022 | ................ F16L 9/04 |
| DE | 4139582 | C1 | | 11/1992 | |
| DE | 102004019917 | A1 | * | 11/2005 | ............ F16F 1/3863 |
| DE | 102012204845 | A1 | | 10/2013 | |
| DE | 102017111996 | A1 | | 12/2018 | |
| DE | 102017113437 | B4 | * | 9/2020 | .............. F16C 17/02 |
| DE | 102019109641 | A1 | | 10/2020 | |
| DE | 112013004246 | B4 | * | 11/2020 | ............ F16F 1/3828 |
| DE | 102017111667 | B4 | * | 6/2021 | ............ F16F 1/3814 |
| DE | 102017111668 | B4 | * | 6/2021 | .............. F16C 17/10 |
| DE | 102020105248 | B4 | * | 8/2022 | .............. B60G 7/02 |
| EP | 3992491 | A1 | * | 5/2022 | ............ F16F 1/3807 |
| GB | 8471171 | A | * | 9/1960 | |
| JP | H0972365 | A | * | 3/1997 | |

* cited by examiner

*Primary Examiner* — Robert A. Siconolfi
*Assistant Examiner* — Mahbubur Rashid
(74) *Attorney, Agent, or Firm* — Banner & Witcoff, Ltd.

(57) ABSTRACT

A bush may include an inner tube, an outer tube, and an intermediate tube portion made from a compliant material and arranged radially between the inner tube and the outer tube. A radially outer surface of the inner tube and a radially inner surface of the outer tube may each have at least one protruding rib running in a circumferential direction of the bush. The intermediate tube portion may be shaped complementary to the outer surface of the inner tube and the inner surface of the outer tube, so as to fill a space therebetween. The protruding ribs may be configured to cause externally applied radial or axial forces to propagate as substantially normal stress in the intermediate tube portion.

20 Claims, 3 Drawing Sheets

BEARING BUSH FOR VIBRATION ISOLATION BETWEEN TWO VEHICLE COMPONENTS OF A MOTOR VEHICLE

CROSS-REFERENCE TO RELATED APPLICATION

This application claims the benefit of priority to German Patent Application No. 102022209880.3, filed in the German Patent and Trade Mark Office on Sep. 20, 2022, the entire contents of which are incorporated herein by reference.

TECHNICAL FIELD

The present disclosure pertains to a bearing bush for vibration isolation between two vehicle components of a motor vehicle and to a motor vehicle with such a bearing bush. The disclosure particularly pertains to a wheel bearing bush to provide vibration isolation between a wheel and a wheel carrier.

BACKGROUND

A bush is a type of vibration isolator, which may serve as an interface between two vehicle parts. A bush may act as a buffer and absorb at least some mechanical energy transmitted through the interface. A vehicle suspension system may comprise a bush, such as a rubber bush (e.g., a bush made in part or entirely out of rubber), which may separate, and allow some movement between, faces of two metal components of the vehicle suspension system. By allowing the movement, and/or providing damping properties of rubber, the rubber bush may reduce transmission of noise and vibrations through to the body of the vehicle, for example, when travelling over a rough road surface.

Many different types of bush designs exist. A bush may be annular, such as a cylinder. A rubber bush may comprise a rubber component, which may be situated between metal inner and outer tubes, in an example. An important feature of a rubber bush is that relative motion between any two parts connected via the rubber bush is accommodated by strain in the rubber (e.g., allowing radial movement with respect to a symmetry axis of the bush), rather than primarily by shear and/or friction at the interface. Hence, rubber bushes are advantageous for reducing noise and/or vibration, e.g., relative to bushes made of stiffer and/or less elastic material. Rubber bushes with symmetric and/or asymmetric radial stiffness may be used in chassis, and/or to mount e-motors to axles, for example.

In an example case of a wheel bearing, a rubber bush may be positioned between a wheel bearing and a bore in the wheel carrier (e.g., for compliant suspensions) and/or between the wheel bearing and a bore in the wheel itself (e.g., for rigid suspensions). Conventional rubber bushes may exhibit a first elastic stiffness modulus in directions of substantially normal (e.g., compression) strain (e.g., in a vehicle longitudinal, or X, direction and a vehicle vertical, or Z, direction, where the longitudinal and vertical directions refer to directions of the vehicle configured to drive on a surface) due to their symmetric nature. However, the stiffness modulus of rubber may be less when the rubber is shear strained. During steering and/or cornering, the rubber of a rubber bush may experience almost pure shear in the vehicle lateral, or Y, direction. Since the stiffness modulus in the shear direction may be relatively low (e.g., relative to the compression directions) a high amount of undesirable compliance relative to the hub in vehicle lateral direction may occur. Such compliance may affect a buildup of a side force at a tire contact area that is required for creating a steering side force, and may make steering difficult, decrease turning capabilities, and/or lead to skidding or tire damage.

SUMMARY

The following is a simplified summary of certain features of the disclosure. The summary is not an extensive overview and is not intended to identify key or critical elements.

Systems, apparatuses and methods are described for a bearing bush for vibration isolation between two vehicle components of a motor vehicle.

An apparatus may comprise: an inner tube; an outer tube radially outside of the inner tube; and an intermediate tube portion. The inner tube and the outer tube may be substantially annular and form a space therebetween. The intermediate tube portion may comprise a rubber material and may be disposed radially between the inner tube and the outer tube so as to substantially fill at least one circumferential section of the space. A radially outer surface of the inner tube corresponding to the at least one circumferential section may comprise at least one first protruding rib that runs in a circumferential direction and a radially inner surface of the outer tube corresponding to the at least one circumferential section may comprise at least one second protruding rib that runs in a circumferential direction. The at least one first protruding rib and the at least one second protruding rib may be configured to form at least one interface with the intermediate tube portion. The at least one interface may be configured to cause substantially normal strain in an axial direction in response to application of an axial force and substantially normal strain in a radial direction in response to application of a radial force.

The at least one first protruding rib and the at least one second protruding rib may overlap in the axial direction. At least one of the at least one first protruding rib or the at least one second protruding rib may comprise a plurality of protruding ribs. The at least one first protruding rib and the at least one second protruding rib may be alternately arranged in the axial direction. The at least one first protruding rib and the at least one second protruding rib each may comprise lateral faces that are inclined with respect to the radial direction and with respect to the circumferential direction. The at least one circumferential section may comprise an upper section and a lower section opposite to the upper section. The intermediate tube portion, the at least one first protruding rib, and the at least one second protruding rib each may extend around a whole circumference of the apparatus.

The apparatus may comprise at least one further circumferential section, comprising a rubber compression block arranged on the radially outer surface of the inner tube or the radially inner surface of the outer tube so as to form a gap between the rubber compression block and the radially opposite outer tube or inner tube. The at least one further circumferential section may comprise a forward section and a backward section opposite to the forward section. The rubber compression block in the forward section may be different from the backward section in at least one of: a radial thickness; a shape; or a hardness. The at least one first protruding rib and the at least one second protruding rib may be interspersed by axial injection channels along the circumferential direction, wherein the axial injection channels are configured for axial injection of the rubber material during manufacturing of the intermediate tube portion. At least one of the inner tube and the outer tube may be made from a metal material.

A vehicle may comprise: a bearing bush; at least one wheel; and at least one wheel carrier. The bearing bush may comprise: an inner tube; an outer tube radially outside of the inner tube; and an intermediate tube portion. The inner tube and the outer tube may be substantially annular and form a space therebetween. The intermediate tube portion may comprise a rubber material and may be disposed radially between the inner tube and the outer tube so as to substantially fill at least one circumferential section of the space. A radially outer surface of the inner tube corresponding to the at least one circumferential section may comprise at least one first protruding rib that runs in a circumferential direction and a radially inner surface of the outer tube corresponding to the at least one circumferential section may comprise at least one second protruding rib that runs in a circumferential direction. The at least one first protruding rib and the at least one second protruding rib may be configured to form at least one interface with the intermediate tube portion. The at least one interface may be configured to cause substantially normal strain in an axial direction in response to application of an axial force and substantially normal strain in a radial direction in response to application of a radial force.

The at least one first protruding rib and the at least one second protruding rib may overlap in the axial direction. At least one of the at least one first protruding rib or the at least one second protruding rib may comprise a plurality of protruding ribs. The at least one first protruding rib and the at least one second protruding rib may be alternately arranged in the axial direction. The at least one first protruding rib and the at least one second protruding rib each may comprise lateral faces that are inclined with respect to the radial direction and with respect to the circumferential direction. The at least one circumferential section may comprise an upper section and a lower section opposite to the upper section. The intermediate tube portion, the at least one first protruding rib, and the at least one second protruding rib each may extend around a whole circumference of the bearing bush.

The bearing bush may comprise at least one further circumferential section, comprising a rubber compression block arranged on the radially outer surface of the inner tube or the radially inner surface of the outer tube so as to form a gap between the rubber compression block and the radially opposite outer tube or inner tube. The at least one further circumferential section may comprise a forward section and a backward section opposite to the forward section. The rubber compression block in the forward section may be different from the backward section in at least one of: a radial thickness; a shape; or a hardness.

These and other features and advantages are described in greater detail below.

BRIEF DESCRIPTION OF THE DRAWINGS

The accompanying drawings provide further understanding of the present disclosure and are incorporated in and constitute a part of this specification. The drawings, together with the description, serve to explain the principles of the disclosure. Other examples of the present disclosure and many of the advantages of the present disclosure will be readily appreciated as they become better understood by reference to the following detailed description. The elements of the drawings are not necessarily to scale relative to each other. In the figures, like reference numerals denote like or functionally like components, unless indicated otherwise.

Although specific examples are illustrated and described herein, it will be appreciated by those of ordinary skill in the art that a variety of alternate and/or equivalent implementations may be substituted for the specific examples shown and described without departing from the scope of the present disclosure. Generally, this application is intended to cover any adaptations or variations of the specific examples discussed herein.

DETAILED DESCRIPTION

Figure 1:
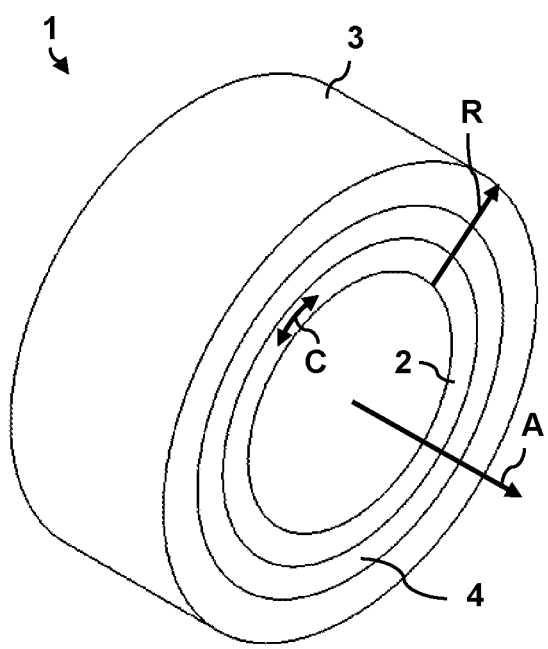
FIG. 1 schematically depicts a bearing bush according to an example of the disclosure in a perspective view.

With reference to FIG. 1, the bush 1 may be a wheel bearing bush. The bush 1 may be formed to comprise a material, such as a rubber, that may offer a normal (e.g., compression) compliance (e.g., stiffness modulus in a radial direction R) that is sufficient to provide dampening (e.g., of road noise, vibrations, and harshness) to improve a user's comfort. The bush 1 may be formed to have a structure and/or material that limits compliance in the axial direction A. The bush 1 may achieve the above compliances while keeping costs, weight and a number of additional parts at an acceptable level. In the following, a wheel bearing application is described in detail. However, it is to be understood that the underlying design principles may be used for different applications for achieving vibration isolation between two vehicle components.

Figure 12:
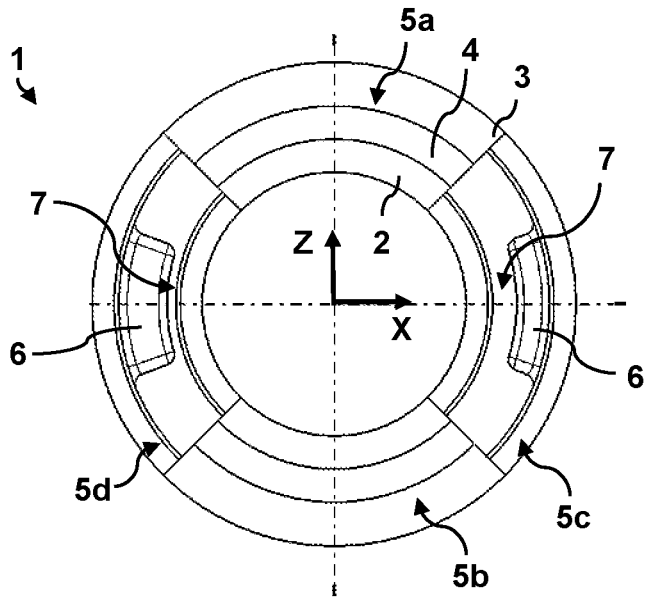
FIG. 12 schematically depicts a rubber bush according to another example of the disclosure in a cross-sectional view.
Figure 13:
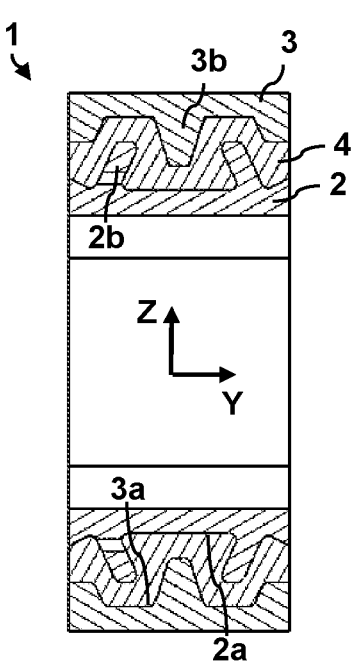
FIGS. 13 and 14 show different cross-sectional views of the rubber bush of FIG. 12.
Figure 14:
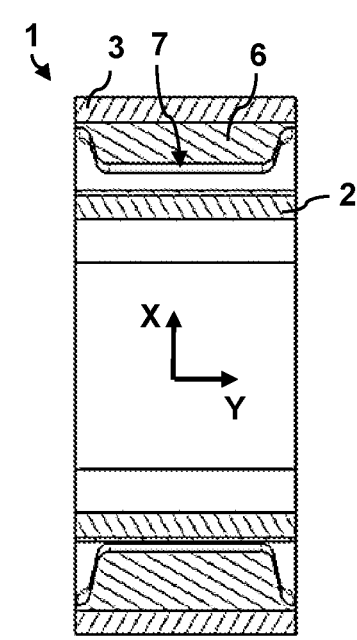

The bush 1 may form an annular cylinder, and may comprise a rubber material component. The rubber material component may be an intermediate tube portion 4, which may made from a rubber material (and/or another material having a desired normal compliance) and arranged radially relative to one or more other components, such as between an inner tube 2 and an outer tube 3. The inner tube 2 and/or the outer tube 3 may have different material properties than the intermediate tube portion 4. For example, the inner tube 2 and/or the outer tube 3 may be a harder material, such as metal. As in the example of FIG. 1, the intermediate tube portion 4 may extend around the whole circumference of the bearing bush 1. Also, or alternatively, and as shown in FIGS. 12 to 14, the intermediate tube portion 4 may form one or more portions around a circumference of the bearing bush 1 (e.g., two opposite circumferential sections 5a, 5b of the bearing bush 1).

Figure 2:
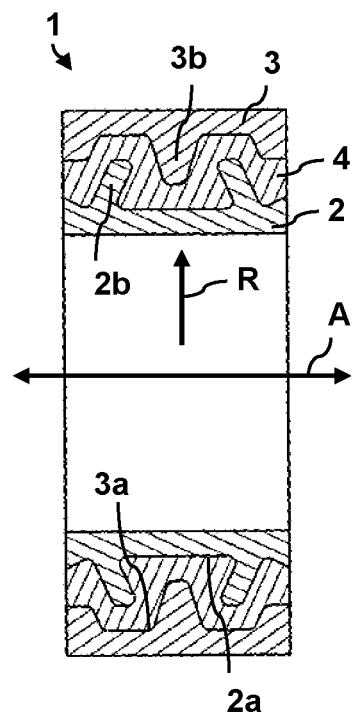
FIG. 2 schematically shows the rubber bush of FIG. 1 in a cross-sectional view.

A radially outer surface of the inner tube 2 may have a structure that corresponds to (e.g., fits into and/or accepts) a structure of a radially inner surface of the outer tube 3. With reference to FIG. 2, for example, a radially outer surface 2a of the inner tube 2 may be configured with two protruding ribs 2b and a radially inner surface 3a of the outer tube 3 may be configured with one protruding rib 3b The two ribs 2b of the inner tube 2 may be configured to extend past the rib 3b of the outer tube 3 on one or sides of the rib 3b in the axial direction A. The protruding ribs 2b and/or 3b may run in a circumferential direction C of the bearing bush 1. The protruding ribs 2b and/or 3b may extend around the whole circumference of the bearing bush 1, and/or around a part of the circumference of the bearing bush 1.

As can be seen in FIG. 2, the intermediate tube portion 4 may be shaped complementary to the outer surface 2a of the inner tube 2 and/or the inner surface 3a of the outer tube 3. The intermediate tube portion 4 may be configured to fill an intermediate space and/or cavity formed between the outer surface 2a and the inner surface 3a. The intermediate tube portion 4 may fill the intermediate space and/or cavity, in part or in whole, with the rubber material between the outer surface 2a of the inner tube 2 and the inner surface 3a of the outer tube 3.

The protruding ribs 2b, 3b may be arranged and shaped to transfer a substantially normal stress to the intermediate tube portion 4, at least in portions, in an axial direction A of the bearing bush 1 under application of an axial force FA. The protruding ribs 2b, 3b may be arranged and/or shaped to also, or alternatively, be able to transfer a substantially normal stress to the intermediate tube portion 4, at least in portions, in a radial direction R of the bearing bush 1 under application of a radial force FR.

To this end, one or more of the protruding ribs 2b and/or 3b may be configured to overlap in the axial direction A. One or more lateral faces of the protruding ribs 2b, 3b may be inclined with respect to the radial direction R. For example two ribs 2b of the inner tube 2 may be inclined towards the rib 3b of the outer tube 3 (e.g., one or more lateral faces of the two ribs 2b may extend towards the rib 3b). The rib 3b may form a substantially triangular profile, e.g., two opposing lateral faces may taper towards each other as the rib 3b extends inward radially. The depicted number, arrangement and shape of the ribs of the figures and as described above are merely an example. A person of skill will readily conceive various other advantageous configurations depending on the application at hand.

Figure 3:
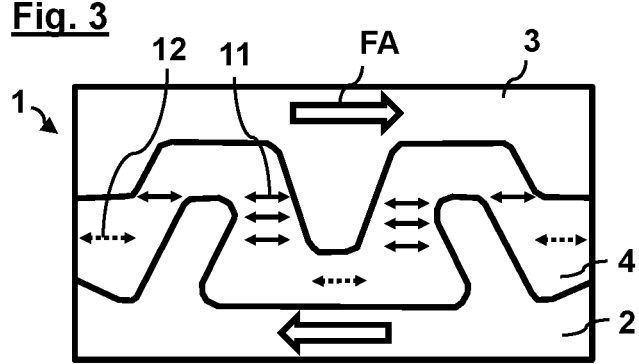
FIGS. 3 and 4 show a detailed view of the structure of FIG. 2 under application of an axial force and a radial force, respectively.
Figure 4:
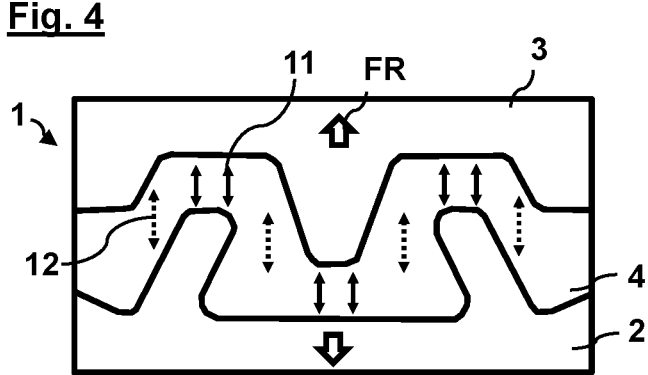

A working principle of the ribs 2b, 3b and the correspondingly formed rubber material of the intermediate tube portion 4 can be understood with reference to FIGS. 3 and 4, which show the top of FIG. 2 under application of an axial force FA (FIG. 3) and a radial force FR (FIG. 4).

In FIG. 4, when an axial force FA is applied (e.g., to an outer surface of the outer tube 3 the ribs 2b, 3b of the inner tube 2 and outer tube 3 of the bearing-bush 1 may contact the intermediate tube portion 4 to cause normal stress 11 in the axial direction A (alternatively referred to, herein, as the vehicle Y direction). Normal (e.g., compression) stress is indicated by the solid arrows in FIG. 4. Thus, the ribs 2b, 3b may cause a majority of the intermediate portion 4 to experience normal stress 11, rather than shear stress 12 (c.f. dotted arrows in FIG. 3) in the vehicle Y axis. This may reduce excessive compliance of the intermediate tube portion 4 due to relative movement in the axial direction A (e.g., during steering and cornering).

Figure 15:
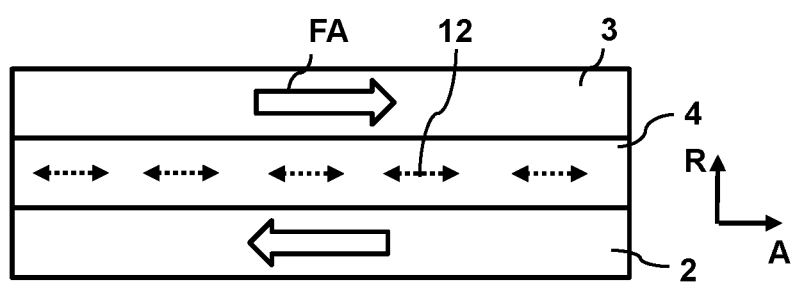
FIG. 15 shows an example for a conventional rubber bush in a cross-sectional view.

By contrast, a conventional rubber bush design may comprise a flat intermediate rubber layer 4 between a flat inner tube 2 and flat outer tube 3, as shown in FIG. 15. The rubber may experience normal stress and therefore provide a desired compliance the radial direction R (symmetrical compliance) but may experience almost pure shear stress 12 in response to a force applied in the axial direction A, which may result in excessive compliance. The stiffness modulus may become relatively low in the axial direction due to the resulting shear strain, which may lead to an undesirably large amount of axial compliance.

The design concept shown in FIG. 3 overcomes these drawbacks of conventional rubber bushes by creating interfaces configured to transmit external force (e.g., axial and/or radial) to the intermediate tube portion 4 so as to cause substantially normal stress and/or substantially a consistent proportion of normal and shear stress in the intermediate tube portion 4, regardless of the direction of the force causing the stress. As can be seen with reference to FIG. 4, the ribs 2b and/or 3b may be designed to cause at least portions of the intermediate tube portion 4 to experience normal stress 11 (e.g., compression) in the radial direction R of the bearing bush 1 under application of a radial force FR. Hence, the bush 1 offers a convenient tradeoff between radial and axial compliance (e.g., allows for consistent compliance regardless of the direction of an external applied force).

The present bush design may have a wide range of potential applications and benefits. For example, it may be used to add a level of compliance and vibration isolation for fragile cargo (e.g., glass bottles, medicinal equipment, etc.), such as may be the case for purpose-built vehicles (PBVs) with solid/rigid suspensions. The bearing bush 1 may be integrated into the inner face of a wheel carrier, for example.

In another example, the bush 1 may be employed in PBVs with compliant suspensions for improved secondary ride and noise, vibration and harshness (NVH) performance. The bush 1 may, for example, be installed into an inner face of a wheel carrier. A standard wheel bearing may also, or alternatively, be pressed into the inner face 2c of the bush 1.

Figure 5:
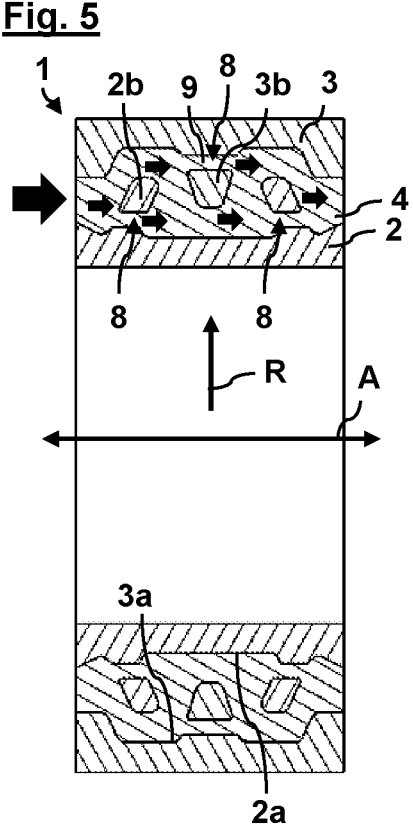
FIG. 5 schematically depicts a rubber bush according to another example of the disclosure in a cross-sectional view.
Figure 6:
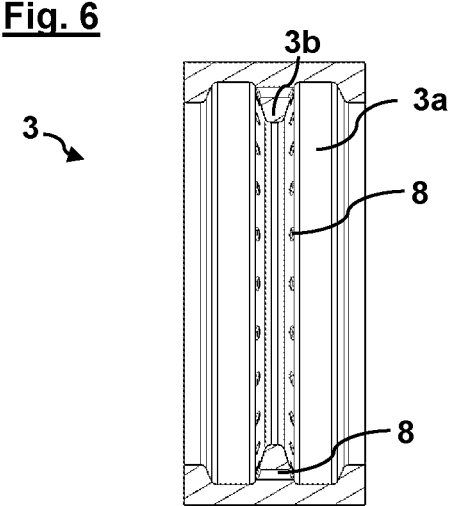
FIGS. 6 to 11 show components of the rubber bush of FIG. 5 in sectional and perspective views.
Figure 7:
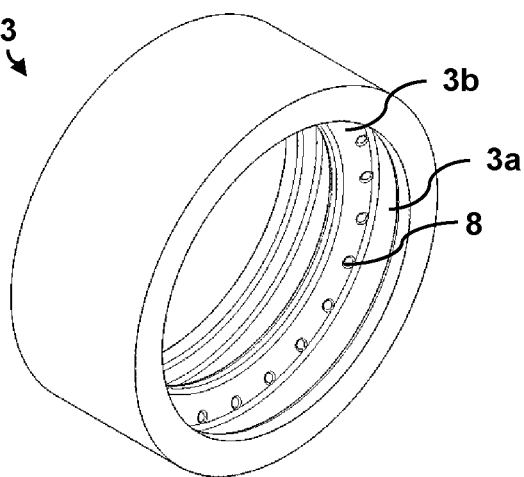
Figure 8:
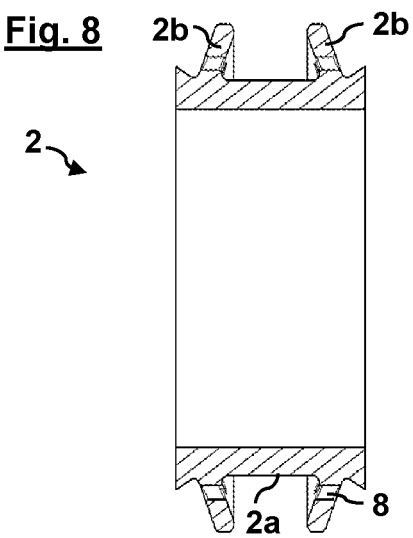
Figure 9:
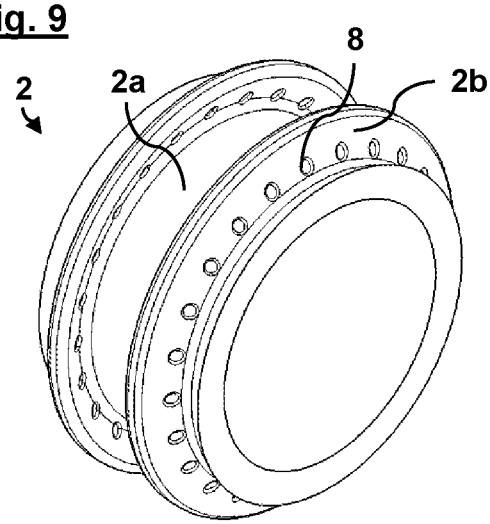
Figure 10:
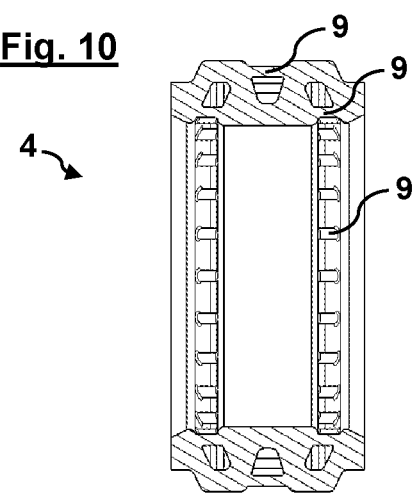
Figure 11:
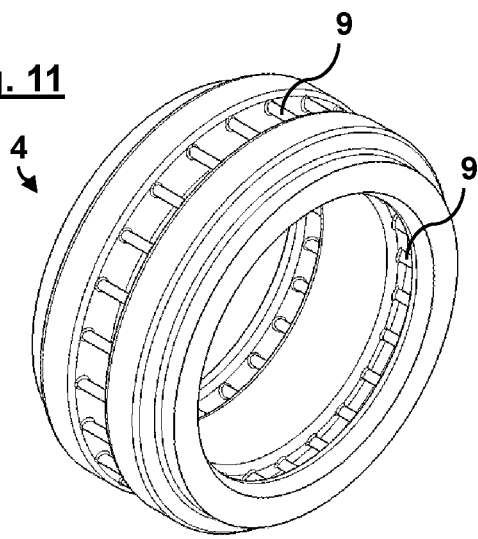

FIG. 5 schematically depicts a bush 1 according to an example of the disclosure in a cross-sectional view. FIGS. 6 to 11 show components of the rubber bush 1 of FIG. 5 in sectional and perspective views.

As depicted in FIG. 5, the protruding ribs 2b and/or 3b of the inner tube 2 and the outer tube 3 may be interspersed by one or more axial injection channels 8. The axial injection channels may be dispersed at regular intervals along the circumferential direction C. The axial injection channels 8 may be configured for axial injection of the rubber material during manufacturing of the intermediate tube portion 4 between the inner tube 2 and the outer tube. The tubes 2, 3 may, for example, be formed by die casting, as well as, or alternatively to, machining steps and/or additive manufacturing.

The one or more axial injection channels 8 may avoid potential problems during a filling process (e.g. in a mold tool). The shape of the ribs 2b and/or 3b may cause the material of the intermediate tube portion 4 to not flow sufficiently to fill the cavity between the inner tube 2 and the outer tube 3 completely. For example, the rubber may not properly reach everywhere on the inside of the inner lateral face of the ribs 2b of the inner tube 2 due to their inclined orientation (axially towards the inside of the rubber bush 1) and material properties of the rubber (e.g., viscosity) during filling. Unfilled pockets could cause in unexpected and/or inferior performance and/or durability of the bush 1.

The one or more axial injection channels 8 may be configured to allow the intermediate tube portion 4 material to flow (e.g., during injection) to reach otherwise difficult to access areas between the ribs 2b and/or 3b. A cross-section of the intermediate tube 4 comprising the axial injection channels 8 can be seen in FIGS. 10 and 11. One or more bridges, such as bridge 9, may be formed by filling the one or more channels 8, such that the intermediate tube 4 and connecting portions of the intermediate tube 4 on different sides of respective ribs 2b and/or 3b may be connected via the one or more bridges 9.

The intermediate tube portion 4 need not extend entirely along a circumference of the bush 1. For example, the intermediate tube portion 4 may comprise a section 5 that extends only partially along the circumference of the bush 1, and/or multiple sections 5a,5b,5c, etc., that extend circumferentially along multiple portions of the bush 1. FIGS. 12 to 14 illustrates an example where the intermediate tube portion 4 and the ribs 2b, 3b of the inner and outer tubes 2, 3 are formed in two opposite circumferential sections 5a, 5b of the bearing bush 1, an upper (with respect to the directions of FIG. 12) section 5a and a lower section 5b.

The bush 1 having two opposite circumferential sections 5a, 5b may result in asymmetric compliance in the vehicle X direction (as indicated in FIG. 12). To this end, the bush 1 may comprise two further circumferential sections 5c, 5d, a forward section 5c (with respect to the X direction of FIG. 12) and a backward section 5d. The forward section 5c and the backward section 5d may comprise a compression block 6 (e.g., a rubber compression block), which may be adjacent to a radially inner surface 3a of the outer tube 3 and/or a radially outer surface 2a of the inner tube 2. The forward section 5c and the backward section 5d may form a gap 7 between the compression block 6 and the respective radially opposite outer tube 3 and/or the inner tube 2. The rubber block 6 may feature the same and/or a different material (e.g., the same and/or a different rubber) as the material comprising the used in the upper section 5a and/or lower section 5b. Furthermore, as indicated in FIG. 12, the compression block 6 in the forward section 5c may have a different radial thickness and/or geometry (e.g., radial cross-section profile) and/or shore hardness than the compression block 6 in the backward section 5d, which may result in different compliance in of the bush in a forward X and backward X direction.

The upper section 5a and the lower section 5b of the bush 1 may function as described for the intermediate tube portion 4 with respect to FIGS. 1 to 11. In particular, the upper section 5a and the lower section 5b may allow for maintaining a relatively constant stiffness in vehicle Y direction (e.g., due to experiencing a substantially constant ratio of normal to shear stress throughout). The compliance blocks 6 (e.g., on either side of the inner tube 2 in FIG. 12) may allow for a low wheel stiffness in the X direction initially (e.g., when the inner tube 2 and outer tube 3 initially move relatively to each other in the X direction), but that increases progressively with further increasing movement relative to each other in the X direction.

According to one aspect, a bearing bush for vibration isolation between two vehicle components of a motor vehicle, the bush taking the form of an annular cylinder, comprises an inner tube; an outer tube; and an intermediate tube portion made from a rubber material and arranged radially between the inner tube and the outer tube at least in two opposite circumferential sections of the bearing bush; wherein a radially outer surface of the inner tube and a radially inner surface of the outer tube are each configured with at least one protruding rib, the protruding ribs running in a circumferential direction of the bearing bush along the two opposite circumferential sections of the bearing bush; wherein the intermediate tube portion is shaped complementary to the outer surface of the inner tube and the inner surface of the outer tube to fill up an intermediate space with the rubber material between the outer surface of the inner tube and the inner surface of the outer tube along the two opposite circumferential sections of the bearing bush; and wherein the protruding ribs are arranged and shaped such that the rubber material of the intermediate tube portion is placed substantially in direct compression at least in portions in an axial direction of the bearing bush under application of an axial force and substantially in direct compression at least in portions in a radial direction of the bearing bush under application of a radial force.

According to another aspect, a motor vehicle comprises a bearing bush according to the disclosure, wherein the bush provides vibration isolation between two vehicle components of the motor vehicle, in particular between a wheel and a wheel carrier.

One idea of the present disclosure is to achieve high axial stiffness in a rubber bush by designing ribs into the inner and outer tubes around a correspondingly formed intermediate rubber layer. The ribs are designed specifically to place the rubber in direct compression in the axial direction (vehicle Y direction in case of a wheel bearing). The ribs force a significant bulk of the rubber to work in direct compression rather than shear in this direction. Thus, for example, the compliance of a wheel center may be significantly minimized in the steering and cornering (vehicle Y) direction. At the same time, the ribs are designed such that there is always sufficient rubber volume available in the directions transverse to the symmetry axis (vehicle X and Z directions in case of a wheel bearing) to work in compression, since this is the primary provider of noise and vibration isolation to either the passengers or fragile cargo in a vehicle.

The proposed design of a wheel bearing-bush aims to bridge the gap between rigid suspension and compliant suspension systems. By design and choice of materials, a reasonable level of compliance may be provided without increasing part count and complexity significantly. This may be particularly relevant for PBV use cases (i.e. purpose-built vehicles), since PBVs are not expected to steer at high speeds and this tradeoff may be sufficient to maintain the steering and cornering ability of the PBV.

It is understood that the term "vehicle" or "vehicular" or other similar term as used herein is inclusive of motor vehicles in general such as passenger automobiles including sports utility vehicles (SUV), buses, trucks, various commercial vehicles, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Advantageous examples and improvements of the present disclosure are found in the subordinate claims.

According to an example, the protruding ribs of the inner tube and the outer tube may overlap in the axial direction.

In this case, the overlapping portions of the rips facilitate direct compression of the rubber in the axial direction.

According to an example, the protruding ribs may be alternately arranged on the inner tube and the outer tube in the axial direction.

Hence, for example, one or several pairs of ribs with one rib on the outer tube and the other on the inner tube may be arranged such as to facilitate direction compression of the rubber in the axial direction in the space between them.

According to an example, lateral faces of the protruding ribs may be inclined with respect to the radial direction.

Thus, not only position and extension of the ribs but also their shape may be utilized as a design parameter to achieve the desired compression behavior of the rubber, in particular in the axial direction.

According to an example, the two circumferential sections of the bearing bush may constitute an upper section and a lower section of the bearing bush.

Hence, in case of a wheel bearing, the bush may be provided with high-axial stiffness portions in particular at the top and bottom of the bearing bush.

According to an example, the intermediate tube portion may extend around the whole circumference of the bearing bush, thereby forming an intermediate tube made of the rubber material. The protruding ribs of the inner tube and the outer tube may also extend around the whole circumference of the bearing bush.

Thus, the bearing bush may feature a cylinder symmetric design, in which the whole circumference of the bush is designed for high axial stiffness. At the same time, due to its symmetric design, the bush also features symmetric compliance in the radial direction, that is, vehicle X and Z directions in case of a wheel bearing.

According to an example, the bearing bush may comprise two further circumferential sections, in each of which a rubber compression block is placed on the radially outer surface of the inner tube or the radially inner surface of the outer tube such that an air gap remains between the rubber compression block and the respective radially opposite outer tube or inner tube.

Hence, in an alternative design concept, asymmetric longitudinal and vertical compliance is provided, e.g. for PBV use case requirements (passenger or cargo). This design approach also opens up to possibility to use two different rubber compounds in the vehicle X and Z directions. In an upper and lower circumferential section, a symmetric design may be kept.

The required compliance and isolation in the vertical (vehicle Z) direction may thus be delivered by the elastic rubber material between the formed inner and outer tubes. However, the longitudinal (vehicle X) compliance is delivered when the same rubber volume deflects in its shear direction.

The travel is then controlled and limited by the compliance blocks of rubber on either side of the inner tube. With this design, it is possible to offer a low wheel stiffness in the compliance direction initially and then increase it progressively with further increasing travel.

According to an example, the two further circumferential sections of the bearing bush may constitute a forward section and a backward section of the bearing bush.

According to an example, the rubber compression block in the forward section may have a different radial thickness, shape and/or shore hardness than the rubber compression block in the backward section.

Initial low wheel stiffness in the compliance direction and subsequent progressive increase with further travel can be achieved by designing each compliance block of a different height and/or geometry (shape) and/or different shore hardness.

According to an example, the protruding ribs of the inner tube and/or the outer tube may be interspersed by axial injection channels at regular intervals along the circumferential direction configured for axial injection of the rubber material during manufacturing of the intermediate tube portion between the inner tube and the outer tube.

The bearing-bush can be produced using existing axle bush production technology. One of the challenges that could occur with this part is during the rubber filling process in the mold tool. Due to the shape of the ribs, there could be a possibility that the rubber does not flow sufficiently to fill the cavity/space between the inner and outer tube completely. The result could be unfilled pockets, potentially leading to unexpected part performance and durability. This risk is minimized presently by creating channels (e.g., bores) in the inner and outer tubes at regular intervals along its circumference. The bores enable the rubber to flow into all areas of the cavity and fill the cavity completely. The inner and outer tubes with bores can be produced, for example, using additive manufacturing technology in case tooling access to machine the bores after die-casting should be limited.

According to an example, the inner tube and/or the outer tube may be made from a metal material.

In the foregoing detailed description, various features are grouped together in one or more examples with the purpose of streamlining the disclosure. It is to be understood that the above description is intended to be illustrative, and not restrictive. It is intended to cover all alternatives, modifications and equivalents of the different features and examples. Many other examples will be apparent to one skilled in the art upon reviewing the above specification. The examples were chosen and described in order to explain the principles of the disclosure and its practical applications, to thereby enable others skilled in the art to utilize the disclosure and various examples with various modifications as are suited to the particular use contemplated.

REFERENCE LIST 1 bearing bush
2 inner tube
2a radially outer surface
2b inner protruding rib
3 outer tube
3a radially inner surface
3b outer protruding rib
4 intermediate tube portion
5a upper circumferential section
5b lower circumferential section
5c forward circumferential section
5d backward circumferential section
6 rubber compression block
7 air gap
8 axial injection channel
9 rubber channel
10 motor vehicle
11 normal stress
12 shear stress
A axial direction
FA axial force
R radial direction
FR radial force
C circumferential direction
X,Y,Z vehicle coordinates

The invention claimed is:
1. An apparatus, comprising:
an inner tube;
an outer tube radially outside of the inner tube; and
an intermediate tube portion,
wherein the inner tube and the outer tube are substantially annular and form a space therebetween;
wherein the intermediate tube portion comprises a rubber material and is disposed radially between the inner tube and the outer tube so as to substantially fill at least one circumferential section of the space;

wherein a radially outer surface of the inner tube corresponding to the at least one circumferential section comprises at least one first protruding rib that runs in a circumferential direction and a radially inner surface of the outer tube corresponding to the at least one circumferential section comprises at least one second protruding rib that runs in the circumferential direction;

wherein the at least one first protruding rib and the at least one second protruding rib are configured to form at least one interface with the intermediate tube portion;

wherein the at least one interface is configured to cause substantially normal strain in an axial direction in response to application of an axial force and substantially normal strain in a radial direction in response to application of a radial force; and wherein the at least one first protruding rib and the at least one second protruding rib are interspersed by axial injection channels along the circumferential direction, wherein the axial injection channels are configured for axial injection of the rubber material during manufacturing of the intermediate tube portion.

2. The apparatus according to claim 1, wherein the at least one first protruding rib and the at least one second protruding rib overlap in the axial direction.

3. The apparatus according to claim 1, wherein at least one of the at least one first protruding rib or the at least one second protruding rib comprise a plurality of protruding ribs; and
wherein the at least one first protruding rib and the at least one second protruding rib are alternately arranged in the axial direction.

4. The apparatus according to claim 1, wherein the at least one first protruding rib and the at least one second protruding rib each comprise lateral faces that are inclined with respect to the radial direction and with respect to the circumferential direction.

5. The apparatus according to claim 1, wherein the at least one circumferential section comprise an upper section and a lower section opposite to the upper section.

6. The apparatus according to claim 1, wherein the intermediate tube portion, the at least one first protruding rib, and the at least one second protruding rib each extend around a whole circumference of the apparatus.

7. The apparatus according to claim 1, further comprising at least one further circumferential section, comprising a rubber compression block arranged on the radially outer surface of the inner tube or the radially inner surface of the outer tube so as to form a gap between the rubber compression block and the radially opposite outer tube or inner tube.

8. The apparatus according to claim 7, wherein the at least one further circumferential section comprises a forward section and a backward section opposite to the forward section.

9. The apparatus according to claim 8, wherein the rubber compression block in the forward section is different from the backward section in at least one of:
a radial thickness;
a shape; or
a hardness.

10. The apparatus according to claim 1, wherein at least one of the inner tube and the outer tube is made from a metal material.

11. A vehicle comprising:
a bearing bush;
at least one wheel; and
at least one wheel carrier;
wherein the bearing bush comprises:
an inner tube;
an outer tube radially outside of the inner tube; and
an intermediate tube portion,
wherein the inner tube and the outer tube are substantially annular and form a space therebetween;
wherein the intermediate tube portion comprises a rubber material and is disposed radially between the inner tube and the outer tube so as to substantially fill at least one circumferential section of the space;
wherein a radially outer surface of the inner tube corresponding to the at least one circumferential section comprises at least one first protruding rib that runs in a circumferential direction and a radially inner surface of the outer tube corresponding to the at least one circumferential section comprises at least one second protruding rib that runs in the circumferential direction;
wherein the at least one first protruding rib and the at least one second protruding rib are configured to form at least one interface with the intermediate tube portion;
wherein the at least one interface is configured to cause substantially normal strain in an axial direction in response to application of an axial force and substantially normal strain in a radial direction in response to application of a radial force; and
wherein the at least one first protruding rib and the at least one second protruding rib are interspersed by axial injection channels along the circumferential direction, wherein the axial injection channels are configured for axial injection of the rubber material during manufacturing of the intermediate tube portion.

12. The vehicle according to claim 11, wherein the at least one first protruding rib and the at least one second protruding rib overlap in the axial direction.

13. The vehicle according to claim 11, wherein at least one of the at least one first protruding rib or the at least one second protruding rib comprise a plurality of protruding ribs; and
wherein the at least one first protruding rib and the at least one second protruding rib are alternately arranged in the axial direction.

14. The vehicle according to claim 11, wherein the at least one first protruding rib and the at least one second protruding rib each comprise lateral faces that are inclined with respect to the radial direction and with respect to the circumferential direction.

15. The vehicle according to claim 11, wherein the at least one circumferential section comprise an upper section and a lower section opposite to the upper section.

16. The vehicle according to claim 11, wherein the intermediate tube portion, the at least one first protruding rib, and the at least one second protruding rib each extend around a whole circumference of the bearing bush.

17. The vehicle according to claim 11, wherein the bearing bush comprises at least one further circumferential section, comprising a rubber compression block arranged on the radially outer surface of the inner tube or the radially inner surface of the outer tube so as to form a gap between the rubber compression block and the radially opposite outer tube or inner tube.

18. The vehicle according to claim 17, wherein the at least one further circumferential section comprises a forward section and a backward section opposite to the forward section.

19. The vehicle according to claim 18, wherein the rubber compression block in the forward section is different from the backward section in at least one of:
  a radial thickness;
  a shape; or
  a hardness.

20. An apparatus, comprising:
  an inner tube;
  an outer tube; and
  an intermediate tube portion,
  wherein the intermediate tube portion comprises a rubber material and is disposed radially between the inner tube and the outer tube so as to substantially fill at least one circumferential section of a space between the inner tube and the outer tube;
  wherein a radially outer surface of the inner tube corresponding to the at least one circumferential section comprises at least one first protruding rib;
  wherein a radially inner surface of the outer tube corresponding to the at least one circumferential section comprises at least one second protruding rib;
  wherein the at least one first protruding rib and the at least one second protruding rib are configured to form at least one interface with the intermediate tube portion; and
  wherein the at least one first protruding rib and the at least one second protruding rib are interspersed by axial injection channels along a circumferential direction of the apparatus, wherein the axial injection channels are configured for axial injection of the rubber material during manufacturing of the intermediate tube portion.

* * * * *